(12) United States Patent
Jang et al.

(10) Patent No.: US 7,743,475 B2
(45) Date of Patent: Jun. 29, 2010

(54) PURSE RING HAVING MULTIPLE ROLLERS

(76) Inventors: James Jang, P.O. Box 1084, Cypress, CA (US) 90630; Ricardo Jang, P.O. Box 1084, Cypress, CA (US) 90630

( * ) Notice: Subject to any disclaimer, the term of this patent is extended or adjusted under 35 U.S.C. 154(b) by 689 days.

(21) Appl. No.: 11/740,250

(22) Filed: Apr. 25, 2007

(65) Prior Publication Data

US 2008/0184541 A1    Aug. 7, 2008

(30) Foreign Application Priority Data

Feb. 2, 2007    (KR)  ...................... 10-2007-0011010

(51) Int. Cl.
     *F16B 45/02*      (2006.01)
     *A01K 73/12*      (2006.01)
(52) U.S. Cl. .................... 24/599.9; 24/598.7; 24/598.4; 43/14; 43/104
(58) Field of Classification Search ................ 24/599.9, 24/598.4, 599.1, 599.5, 598.7; 43/14, 104; 114/114; 294/82.19, 82.2
See application file for complete search history.

(56) References Cited

U.S. PATENT DOCUMENTS

| 44,582 A | * | 10/1864 | Balans ........................ 114/114 |
| 90,113 A | * | 5/1869 | McKay et al. ............ 24/115 R |
| 3,158,951 A | * | 12/1964 | Lewis et al. .................... 43/14 |
| 4,894,944 A | | 1/1990 | Jimenez |
| 5,119,735 A | | 6/1992 | Jang et al. |
| 5,287,645 A | | 2/1994 | Gois |
| 5,505,013 A | | 4/1996 | Gois |
| 5,864,929 A | | 2/1999 | Sakong |
| 2005/0172461 A1 | * | 8/2005 | Hall .......................... 24/599.9 |

\* cited by examiner

*Primary Examiner*—Robert J Sandy
(74) *Attorney, Agent, or Firm*—IPLA P.A.; James E. Bame

(57) ABSTRACT

A purse ring for coupling a purse seine and a purse line to each other. The purse ring includes a frame, which is coupled at a first end thereof to the purse seine and passes the purse line through a second end thereof, and at least three rollers, which are rotatably provided in the frame at positions at which the purse line are brought into contact with the frame. The purse seine having the multiple rollers has a structure such that friction between the purse line and the purse ring is reduced, thus increasing the lifetime of the purse ring, thereby reducing costs of replacement of the purse ring.

17 Claims, 8 Drawing Sheets

PURSE RING HAVING MULTIPLE ROLLERS

CROSS REFERENCE

This application claims foreign priority under Paris Convention and 35 U.S.C. §119 to Korean Patent Application No. 10-2007-0011010, filed Feb. 2, 2007 with the Korean Intellectual Property Office.

BACKGROUND OF THE INVENTION

1. Field of the Invention

The present invention relates generally to purse rings having multiple rollers and, more particularly, to a purse ring having multiple rollers which couples a purse line and a purse seine, which are used for fishing, to each other.

2. Description of the Related Art

As well known to those skilled in the art, as fishing equipment used for fishing, purse seines are one kind of fishing nets, used for catching sardines, horse mackerels, mackerels, bonitos, tuna, etc. Such a purse seine and a conventional purse ring are illustrated in FIGS. 1 and 2.

As shown in FIGS. 1 and 2, a purse seine 104 has a rectangular shape, the central portion of which is slightly wider than other portions. Furthermore, a plurality of buoyancy units 106 such as floats is provided along the upper edge of the purse seine 104 in order to make it possible for the upper edge of the purse seine 104 to float on water, and a plurality of weighting units 108 such as chains is provided under the lower edge of the purse seine 104 so as to make it possible for the lower edge of the purse seine 104 to sink under the water. Thus, the purse seine 104 can be oriented upright in the water by the buoyancy units 106 and the weighting units 108. Typically, the purse seine 104 spreads in the water in an approximately circular shape for catching fish.

Furthermore, a purse line 104, which is used when the purse seine 104, which has been spread into a circular shape, is hauled in, is disposed along the lower edge of the purse seine 104. The purse line 104 is coupled to ends of the weighting units 108 through connectors, which are called purse rings 110. In detail, connection members 112 such as ropes or straps are connected to the ends of the weighting units 108. Each connection member 112 is connected to a first end of each purse ring 110. The purse line 114 passes through second ends of the purse rings 110. Thereby, the purse line 114 is coupled to the weighting units 108.

To haul in the purse seine 104, when the purse line 114 is pulled by fishermen on a fishing boat, the weighting units 108 of the purse seine 104 are also pulled, and thus fish are confined while the purse seine 104 is hauled in.

However, in the case of the purse ring 110 according to the conventional technique, due to the weight of the fish and the purse seine 104 being hauled in, a relatively large frictional force is generated on contact surfaces between the purse line 114 and the purse rings 110 when the purse seine 104 is hauled in, thus inducing extreme abrasion of the surfaces of the purse line 114 and the purse rings 110, with the result that they may tear.

This seriously interferes with the fishing operation. Furthermore, maintenance costs increase due to frequent replacement of the purse line 114 or the purse ring 110, thus resulting in reduced income.

SUMMARY OF THE INVENTION

Accordingly, the present invention has been made keeping in mind the above problems occurring in the prior art, and an object of the present invention is to provide a purse ring having multiple rollers which has a structure such that the friction between a purse line and the purse ring is reduced, thus increasing the lifetime thereof, thereby reducing the cost of replacement thereof.

In order to accomplish the above object, the present invention provides a purse ring, to couple a purse seine and a purse line to each other, including: a frame coupled at a first end thereof to the purse seine and having the purse line passing therethrough at a second end thereof; and at least three rollers rotatably provided in the frame at positions at which the purse line is brought into contact with the frame.

Preferably, one roller selected from among the rollers may be disposed to span opposite side parts of the frame.

Furthermore, one roller selected from among the rollers may be provided in one side part of opposite side parts of the frame.

In addition, two rollers selected from among the rollers may be disposed to span opposite side parts of the frame.

As well, two rollers selected from among the rollers may be provided in respective opposite side parts of the frame.

Moreover, one roller selected from among the rollers may be provided in one side part of opposite side parts of the frame, and remaining rollers may be disposed to span the opposite side parts of the frame.

Furthermore, two rollers selected from among the four rollers may be disposed to span opposite side parts of the frame, and two remaining rollers may be provided in respective opposite side parts of the frame.

Preferably, each of the rollers and the frame may be made of stainless steel, a galvanized alloy, or a corrosion-resistant alloy able to withstand force applied to the purse ring during fishing, or a mixture of substances having sufficient mechanical strength.

In addition, an insertion hole, into which a shaft serving as a rotating axis of the roller disposed to span the opposite side parts of the frame is inserted, may be closed by a hemispherical cap to prevent the shaft from being removed from the frame.

As well, a mounting notch may be formed in the one side part or each of the opposite side parts of the frame at a position of the roller provided in the side part or each of the opposite side parts of the frame, and the corresponding roller may be provided in the mounting notch.

Furthermore, an end of a shaft, which serves as a rotating axis of the roller provided in the one side part of the opposite side parts of the frame, may be brought into contact with and engages with a side surface of a shaft, which serves as a rotating axis of the roller disposed to span the opposite side parts of the frame.

Moreover, a frame opening may be formed in the one side part of the opposite side parts of the frame, and the frame opening may be openably closed by a locking unit.

preferably, a frame opening may be formed in the one side part of the opposite side parts of the frame, the frame opening may be openably closed by a locking unit, a protrusion tap may protrude from the frame at a position corresponding to a first end of the frame opening, a hole may be formed in the protrusion tap, and a coil-shaped retainer member may be fitted both over the protrusion tap and over the shaft of the corresponding roller, which is placed in the hole and the mounting notch, to prevent the shaft of the roller from being removed from the frame.

The locking unit may be rotatably coupled to the frame by a hinge to openably close the frame opening. A stopper tap may protrude from the frame at a position corresponding to an outer portion of an end of the locking unit adjacent to the hinge, such that the locking unit is rotatable inwards relative to the frame but is not rotatable outwards relative to the frame.

The locking unit may be rotatably coupled to the frame by the hinge at a position corresponding to a second end of the frame opening and include a guide rod provided with a guide rail, which is longitudinally formed in a surface of the guide rod. A guide stopper may be provided on the guide rod at a position corresponding to the stopper tap to limit rotation of the locking unit.

The locking unit may further include an elastic member provided on a front end of the guide rod; a cylinder, having a rod receiving part provided in a first end of the cylinder to receive the guide rod and the spring, and a tap receiving part provided in a second end of the cylinder to receive the protrusion tap provided on the frame at the position corresponding to the first end of the frame opening; and a guide pin fitted into a surface of the rod receiving part and placed in the guide rail of the guide rod, so that, when the cylinder is moved between a position at which the protrusion tap is inserted into the tap receiving part of the cylinder, and a position at which the protrusion tap is removed from the tap receiving part of the cylinder, the guide pin moves along the guide rail to guide movement of the cylinder, wherein a first locking hole and a second locking hole are formed in respective opposite ends of the guide rail, so that the guide pin, which moves along the guide rail, is locked to the first locking hole or the second locking hole.

Preferably, a first insert part may be provided on a first end of the elastic member and is fastened to a first spring receiving protrusion provided on the front end of the guide rod, and a second insert part may be provided on a second end of the elastic member and fastened to a second spring receiving protrusion provided on a bottom of the rod receiving part of the cylinder, so that, when the guide pin is moved along the guide rail, the cylinder is biased in a rotating direction by elasticity of the elastic member, such that the guide pin is easily inserted into and locked to the first locking hole or the second locking hole.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
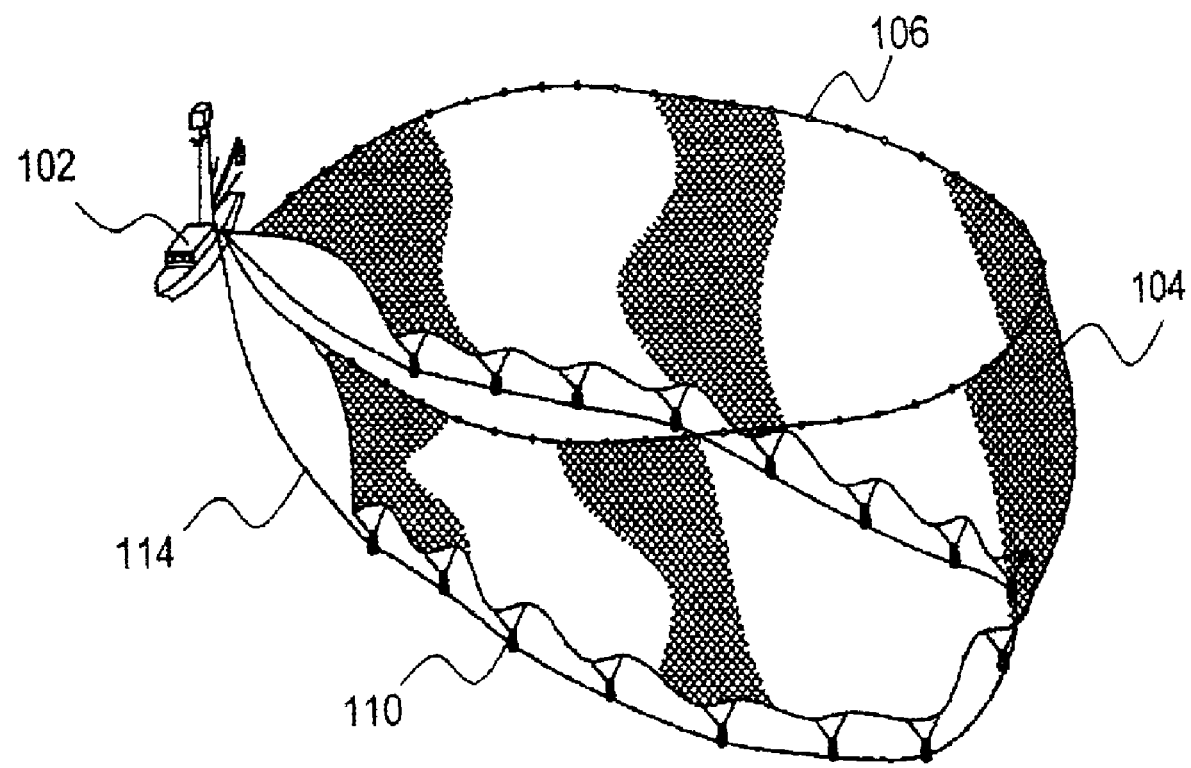
FIG. 1 is a perspective view showing a typical purse seine used in a commercial fishing operation.
Figure 2:
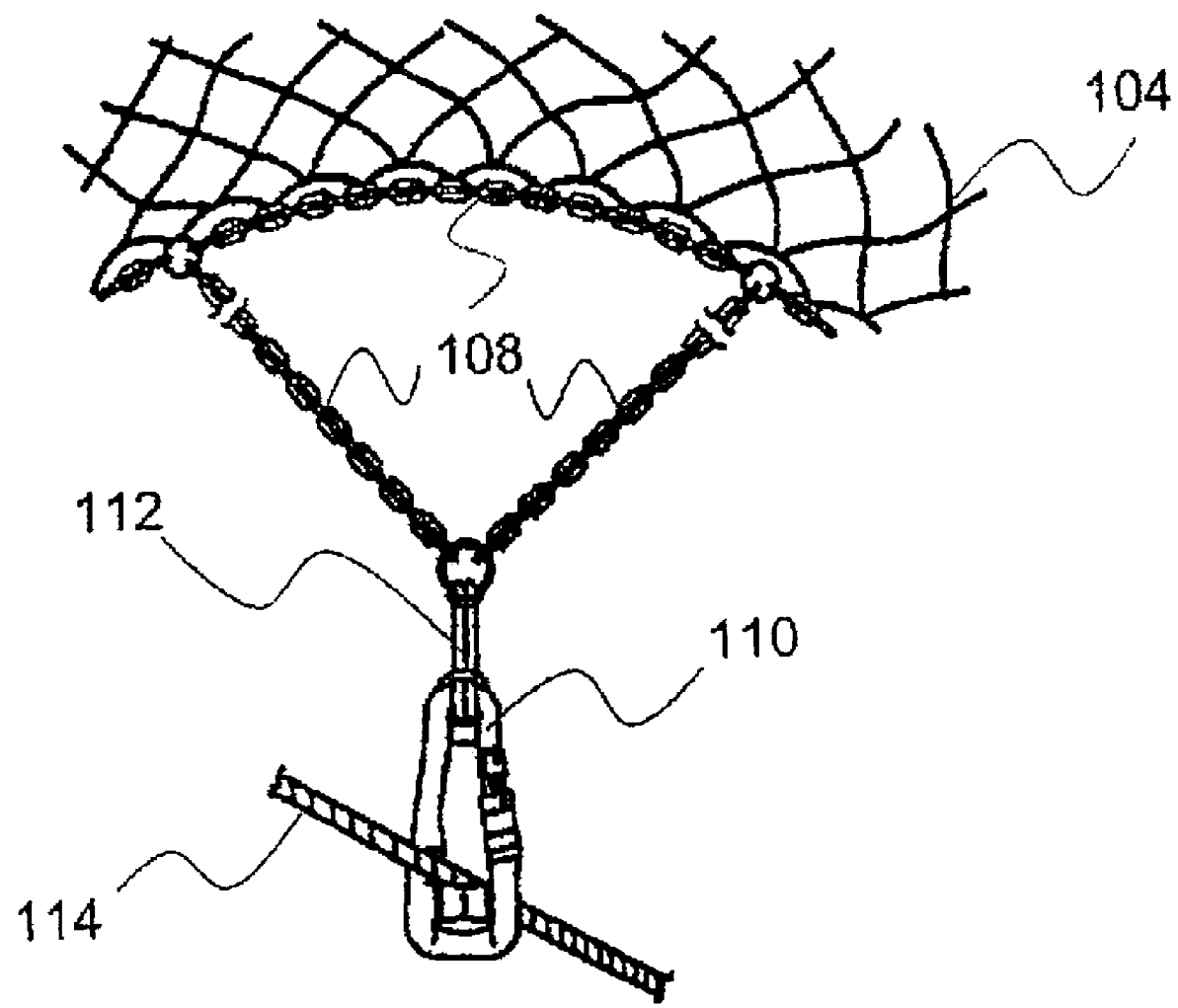
FIG. 2 is a perspective view of a conventional purse ring provided with the purse seine.

Hereinafter, a purse ring having multiple rollers according to a preferred embodiment of the present invention will be described in detail with reference to the attached drawings.

Reference now should be made to the drawings, in which the same reference numerals are used throughout the different drawings to designate the same or similar components.

Figure 3:
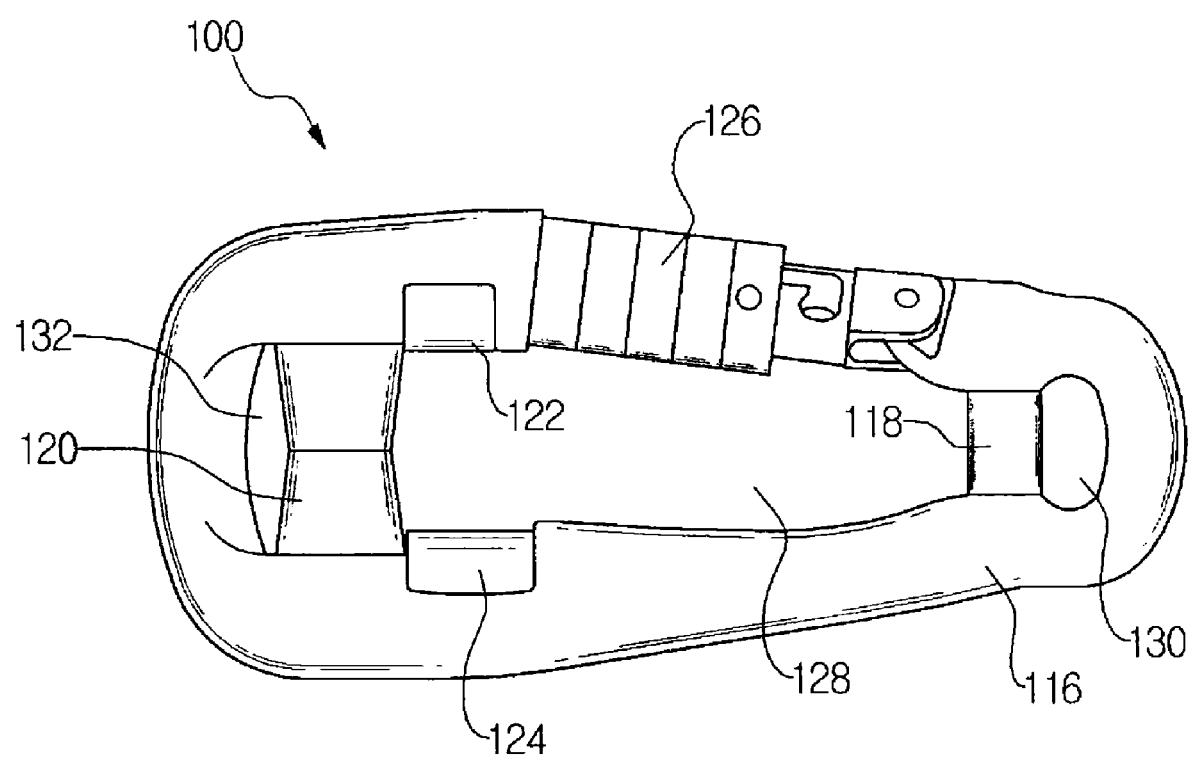
FIG. 3 is a perspective view of a purse ring having multiple rollers, according to a preferred embodiment of the present invention.

FIG. 3 is a perspective view of the purse ring having the multiple rollers, according to the preferred embodiment of the present invention.

Referring to FIG. 3, the purse ring 100 having the multiple rollers according to the preferred embodiment of the present invention is used to connect a purse seine (not shown) to a purse line (not shown) in a commercial fishing operation. The purse ring 100 includes a frame 116, a locking unit 126, a first space 128, a second space 130, a third space 132, and the multiple rollers.

Preferably, the frame 116 has an elliptical shape such that the purse line can pass through the frame 116, but the present invention is not limited to this. In other words, the frame 116 may have any polygonal shape, as long as the purse line can sufficiently pass through the frame 116.

Furthermore, it is preferable that the frame 116 be made of stainless steel, which is relatively hard. Alternatively, the frame 116 may be made of carbon steel, a galvanized alloy or a corrosion-resistant alloy able to withstand the force applied to the purse ring during fishing. As a further alternative, the frame 116 may be made of a mixture of substances having sufficient mechanical strength.

The locking unit 126 is provided at a predetermined position in the frame 116, and will be explained in more detail later herein.

The first space 128 is a hollow space, which is defined in the frame 116 at the position at which the purse line passes through the frame 116. The purse line passes through the first space 128 and is disposed on the first end of the inner surface of the first space 128 in the frame 116.

The second space 130 is a hollow space, into which a connection member (not shown) such as a rope, which is coupled to one end of a weighting unit, is inserted when the connection member is coupled to a second end of the frame 116. The second space 130 is defined by a first roller 118, which will be described later herein. As such, the connection member is coupled to the frame 116 through the second space 130.

The third space 132 is a hollow space, which is defined in the frame by a fourth roller 120, which will be described later herein. Thanks to the third space 132, smooth rotation of the fourth roller 120 is ensured.

The multiple rollers serve to reduce frictional force, which is generated at contact surfaces between the purse line and the purse ring 100 by the weight of the fish and the purse seine being hauled in when fishermen pull the purse line to land fish caught in the purse seine. The multiple rollers, including the first roller 118, a second roller 124, a third roller 122, and the fourth roller 120, are provided in the frame 116 at positions at which the purse line comes into contact with the inner surface of the frame 116 when the purse line is placed through the first space 128 of the frame 116. The multiple rollers will be described in detail later herein with reference to FIG. 4.

As such, in the present invention, thanks to the multiple rollers, the frictional force between the purse line and the purse ring 100 is reduced, and abrasion and wear of the purse line or the purse ring 100 are also markedly reduced. Therefore, expenses incurred for the replacement of elements can be greatly reduced.

In the embodiment of the present invention, four rollers and three spaces have been illustrated as being provided, but the numbers thereof are not limited to these. Those skilled in the art will appreciate that the number of rollers and the number of spaces may be greater or less than these numbers. Furthermore, a roller may be provided in the locking unit 126 to further reduce the frictional force between the purse line and the purse ring 100.

Figure 4:
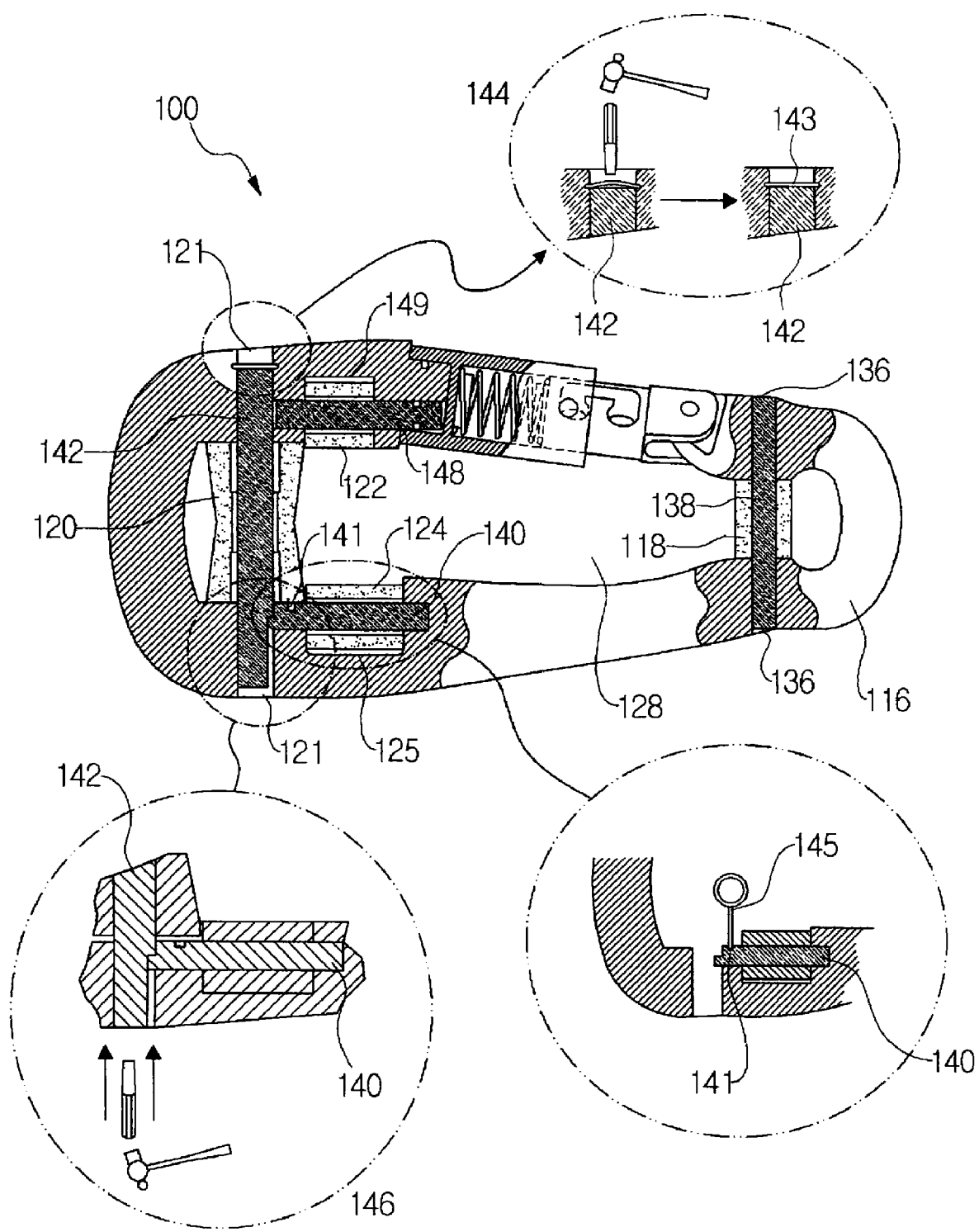
FIG. 4 is a sectional view of the purse ring having the multiple rollers according to the embodiment of the present invention.
Figure 5:
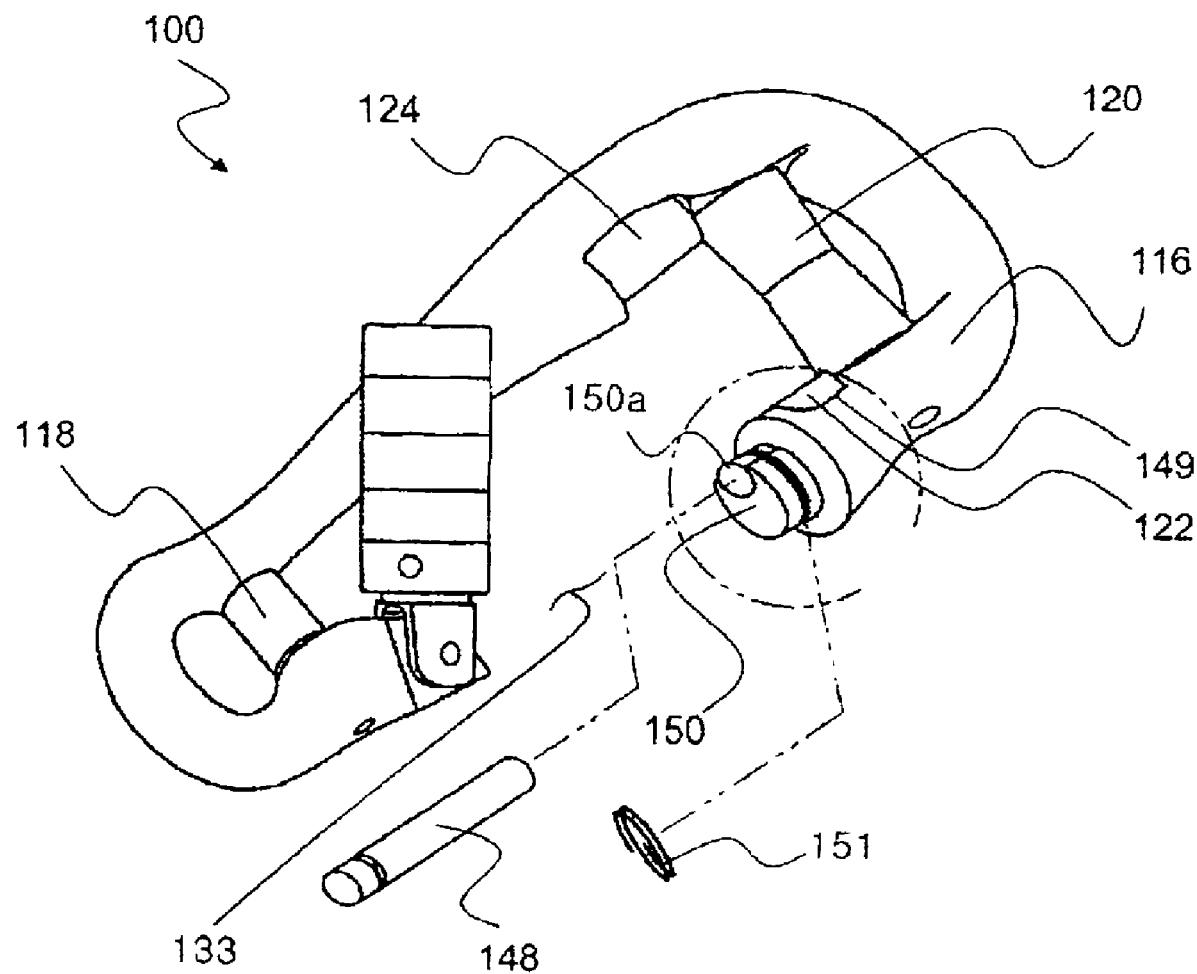
FIG. 5 is an exploded perspective view of the purse ring having the multiple rollers according to the embodiment of the present invention.

FIG. 4 is a sectional view of the purse ring 100 having the multiple rollers according to the embodiment of the present invention. FIG. 5 is an exploded perspective view of the purse ring 100 of the present invention.

Referring to FIGS. 4 and 5, the purse ring 100 according to the embodiment of the present invention has four rollers, including the first roller 118, the second roller 124, the third roller 122 and the fourth roller 120, and a protrusion tap 150.

The first roller 118 is provided in the second end of the frame 116 in a lateral direction to span opposite side parts of the inner surface of the second end of the frame 116, thus defining the second space 130 in the frame 116. Thus, when the connection member provided on the purse seine is coupled to the second end of the frame 116, the connection member is inserted into the second space 130, which is defined by the first roller 118.

Furthermore, insertion holes 136 are formed through the frame 116 at positions corresponding to the respective opposite ends of the first roller 118. A first shaft 138, which serves as a rotating axis for the first roller 118, is rotatably inserted into the insertion holes 136. In addition, the first shaft 138 is removably provided in the frame 116, so that, when the first roller 118 is worn and replacement thereof is thus required, the first shaft 138 is removed from the insertion holes 136 of the frame 116 and, thereafter, the first roller 118 is replaced with a new one.

Preferably, the first roller 118 is made of a material the same as or similar to that of the frame 116, and the first shaft 138 is made of stainless steel.

The second roller 124 is provided in a first side part of the opposite side parts of the inner surface of the frame 116, which is opposite the locking unit 126, at a position at which the purse line is brought into contact with the frame 116 when the purse line is inserted into the first space 128 of the frame 116 and is placed on the first end of the inner surface of the frame 116. The second roller 124 serves to reduce the frictional force between the purse line and the frame 116. Furthermore, a mounting notch 125 is formed in the first side part of the frame 116, in which the second roller 124 is provided. A second shaft 140 is installed in the mounting notch 125 in a direction that crosses the mounting notch 125. The second roller 124 is rotatably fitted over the second shaft 140.

In the same manner as the first roller 118, the second roller 124 is also preferably made of the same material as that of the frame 116, and the second shaft 140 is made of stainless steel.

Meanwhile, a tool insertion hole 141 may be formed in an end of the second shaft 140, such that a tool can be inserted into the too insertion hole 141 to easily rotate and move the second shaft 140. In other words, when the second shaft 140 is installed in the mounting notch 125, a tool such as a pin 145 is inserted into the tool insertion hole 141 such that the second shaft 140 can be easily moved in a leftward or rightward direction, thus facilitating installation of the second shaft 140 in the mounting notch 125.

The third roller 122 is provided in a second side part of the opposite side parts of the inner surface of the frame 116, in which the locking unit 126 is disposed, at a position at which the purse line is brought into contact with the frame 116. The third roller 122 also serves to reduce the frictional force between the purse line and the frame 116. Furthermore, a mounting notch 149 is formed in the second side part of the frame 116, in which the third roller 122 is provided. A third shaft 148 is installed in the mounting notch 149 in a direction that crosses the mounting notch 149. The third roller 122 is rotatably fitted over the third shaft 148.

Furthermore, a frame opening 133 is formed at a predetermined position in the second side part of the frame 116, such that, when the purse line is placed into the first space 128 of the frame 116, the purse line can be easily inserted into the first space 128.

The protrusion tap 150 protrudes from a first end of the second side part of the frame 116, that is, is disposed at an end of the frame opening 133 (see, FIG. 5), such that the locking unit 126 can be easily locked to or loosened from the protrusion tap 150.

Furthermore, a hole 150a, a portion of which is open through the sidewall of the protrusion tap 150, is formed through the protrusion tap 150 to ensure installation of the third shaft 148 in the mounting notch 149. Thus, the third shaft 148 is placed into the mounting notch 149 through the hole 150a of the protrusion tap 150.

Here, a first end of the third shaft 148 is disposed in the hole 150a of the protrusion tap 150. A retainer member 151, such as a coil or ring, may be fitted over both the third shaft 148 and the protrusion tap 150 to reliably maintain the position of the third shaft 148 in the hole 150a.

In the same manner as the first roller 118, the third roller 122 is also preferably made of the same material as that of the frame 116, and the third shaft 148 is made of stainless steel.

The fourth roller 120 is provided in the first end of the frame 116, which is opposite the first roller 118 provided in the second end of the frame 116, in a lateral direction spanning opposite side parts of the inner surface of the first end of the frame 116. Thus, the fourth roller 120 serves to reduce the frictional force of the purse line inserted into the frame 116. Furthermore, insertion holes 121 are formed through the frame 116 at positions corresponding to respective opposite ends of the fourth roller 120. A fourth shaft 142, which serves as a rotating axis for the fourth roller 120, is rotatably inserted into the insertion holes 121.

In the same manner as the first roller 118, preferably, the fourth roller 120 is also made of the same material as that of the frame 116, and the fourth shaft 142 is made of stainless steel.

In addition, a first end 146 of the fourth shaft 142 and the second shaft 140 are constructed such that they correspond to each other. In detail, the end of the second shaft 140 is placed on the first end 146 of the fourth shaft 142. The surface of the first end 146 of the fourth shaft 142 that faces the second shaft 140 is shaped such that the end of the second shaft 140 is brought into close contact with the surface of the first end 146 of the fourth shaft 142, that is, such that they engage with each other. Therefore, the fourth shaft 142 is stopped by the end of the second shaft 140 and thus prevented from being undesirably removed from the frame 116.

The insertion hole 121 of the frame 116, which is adjacent to the second end 144 of the fourth shaft 142, is closed by a cap 143, such that the fourth shaft 142 is prevented from being removed from the frame 116. The cap 143 is forcibly fitted into the insertion hole 121 using a hammer or the like. When it is desired to open the insertion hole 121, for example, when it is desired to replace the fourth shaft 142 or the fourth roller 120, an impact is applied to the first end 146 of the fourth shaft 142 using the hammer or the like, thus removing the cap and opening the insertion hole 121.

As such, the purse ring 100 according to the embodiment of the present invention can reduce the frictional force generated at the contact surfaces between the purse line and the purse ring 100 using the four rollers including the first roller 118, the second roller 124, the third roller 122 and the fourth roller 120. Each of the four rollers may have a cylindrical shape or a bow tie or hourglass shape, which is reduced in diameter from the opposite ends thereof to the central portion. Furthermore, each roller may comprise a roller or a roller assembly having another shape to reduce the frictional force between the purse line and the purse ring 100.

Figure 6:
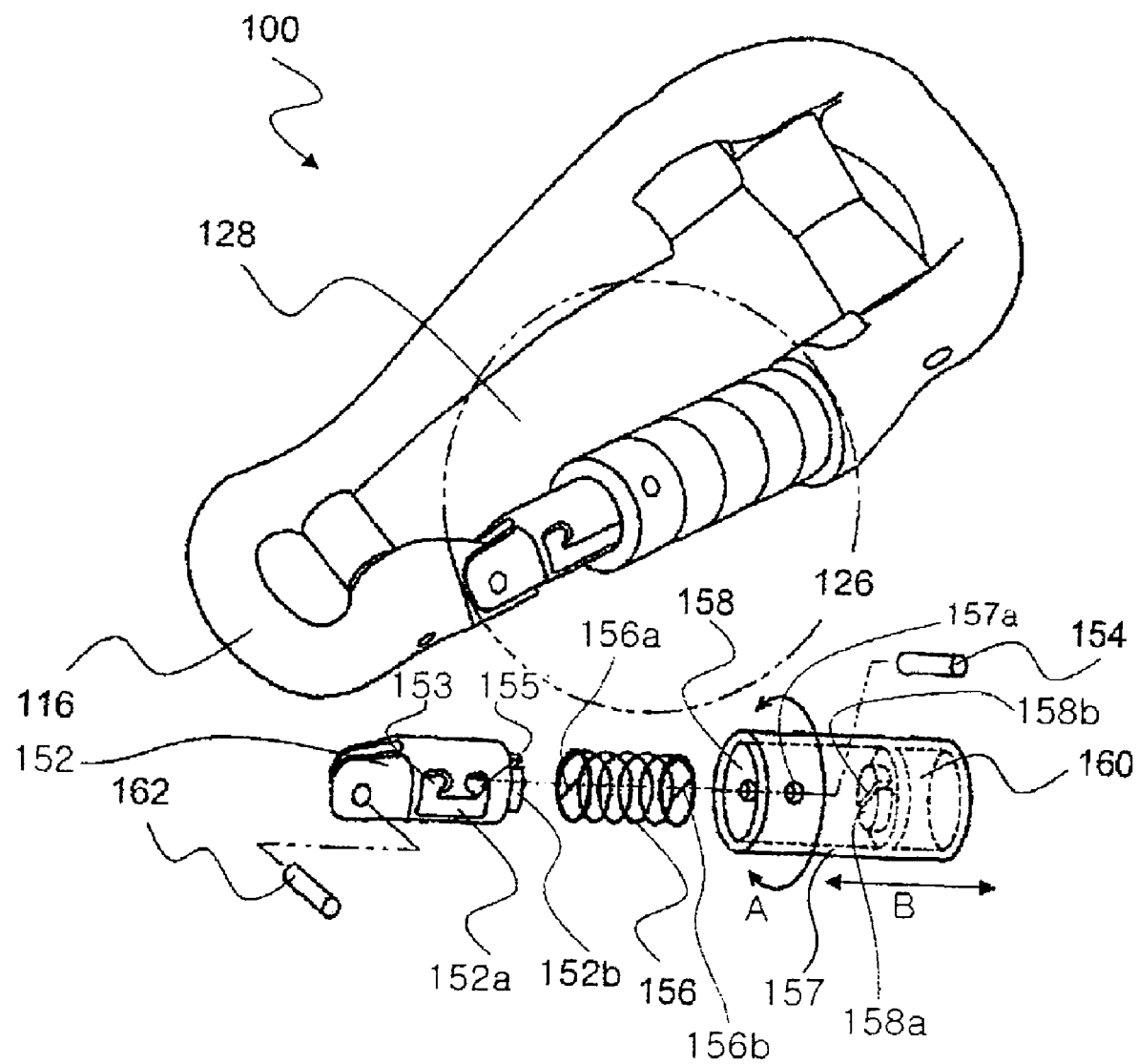
FIG. 6 is an exploded perspective view showing a locking unit of the purse ring having the multiple rollers according to the embodiment of the present invention.

FIG. 6 is an exploded perspective view showing the locking unit 126 of the purse ring 100 according to the embodiment of the present invention.

Referring to FIG. 6, the locking unit 126 of the purse ring 100 serves to openably close the frame opening 133 (see FIG. 5), which is formed in the frame 116, such that, when the purse line is placed into the first space 128 of the frame 116, the purse line can be easily inserted into the first space 128. Furthermore, the locking unit 126 includes a guide rod 152, a guide pin 154, an elastic member and a cylinder 157.

The guide rod 152 is rotatably coupled to the frame 116 by a hinge pin 162 at a position adjacent to the second end of the frame opening 133, which is opposite the protrusion tap 150 (see, FIG. 5) provided in the first end of the frame opening 133.

Furthermore, a guide rail 152 is longitudinally formed in one surface of the guide rod 152, so that the guide pin 154, which has a cylindrical shape, is perpendicularly placed in the guide rail 152 so as to be movable along the guide rail 152. A first locking hole 153 and a second locking hole 155 are respectively formed in first and second ends of the guide rail 152a. The guide pin 154 is locked to the first or second locking hole 153 or 155. As such, the guide pin 154 is moved along the guide rail 152a, and, when the guide pin 154 is locked to the first or second locking hole 153 or 155 of the guide rail 152a, the movement thereof is limited.

Meanwhile, a first spring seating protrusion 152b is provided on the front end of the guide rod 152 to fasten a spring 156, which will be described later herein, to the guide rod 152. In addition, a first insertion slot 152c (see, FIG. 7a), into which a first insert part 156a of the spring 156 is inserted, is formed in the first spring seating protrusion 152b.

The elastic member comprises the spring 156 or the like, which has elasticity, which is a property that enables it to recover its original state upon the removal of pressure that has changed its shape. The first end of the spring 156 is fitted over the first spring seating protrusion 152b of the guide rod 152. At this time, the first insert part 156a, which extends from the first end of the spring 156 in the transverse direction of the spring 156, is inserted into the first insertion slot 152c (see, FIG. 7a) of the first spring seating protrusion 152b. Thus, the spring 156 is reliably fastened to the first spring seating protrusion 152b of the guide rod 152.

Furthermore, a second insert part 156b extends from the second end of the spring 156 in the transverse direction of the spring 156 and is inserted into a second insertion slot 158b of the cylinder 157, which will be explained later herein. Thus, the first end of the spring 156 is firmly fastened to the guide rod 152, and the second end of the spring 156 is firmly fastened to the cylinder 157 of the locking unit 126.

The cylinder 157 has in a first end thereof a rod receiving part 158, into which the guide rod 152 and the spring 156 are inserted, and has in a second end thereof a tap receiving part 160, into which the protrusion tap 150 of the frame 116 is removably inserted.

Here, to ensure ease of insertion of the spring 156 into the rod receiving part 158 and to prevent the spring 156 from being undesirably removed from the rod receiving part 158, a second spring seating protrusion 158a is provided on the bottom in the rod receiving part 158, and the inner surface of the second end of the spring 156 is fitted over the second spring seating protrusion 158a.

In addition, the second insertion slot 158b is formed in the second spring seating protrusion 158a, so that the second insert part 156b of the spring 156 is inserted into the second insertion slot 158b of the second spring seating protrusion 158a. Thus, the spring 156 can be firmly fastened to the bottom of the rod receiving part 158.

A pin hole 157a, into which the guide pin 154, which is moved along the guide rail 152a of the guide rod 152, is fitted, is formed at a predetermined position through the sidewall of the cylinder 157 which receives therein the guide rod 152, so that the cylinder 157 is movable along with the guide pin 154 along the guide rail 152.

In the cylinder 157 of the locking unit 126, the guide pin 154 of which is moved along the guide rail 152a from the first locking hole 153 to the second locking hole 155 or from the second locking hole 155 to the first locking hole 153, while the cylinder 157 is disposed at the position at which the protrusion tap 150 of the frame 116 is inserted into the cylinder 157 to close the frame opening 133 (see, FIG. 5) of the frame 116, the cylinder 157 can reliably maintain its position thanks to the spring 156 placed in the cylinder 157, as long as outside force is not applied thereto. Meanwhile, in the state in which the guide pin 154 is locked to the first locking hole 153 of the guide rail 152a, and thus the cylinder 157 is at a position at which the frame opening 133 of the frame 116 is open, if the cylinder 157 is rotated in the direction A and the guide pin 154 is thus removed from the locking hole 153, the cylinder 157 is advanced in the direction B by the elastic force of the spring 156. As a result, the frame opening 133 is closed by the advancement of the cylinder 157. As such, the frame opening 133 of the frame 116 can be easily opened and closed.

As such, when the cylinder 157 is advanced forwards or retracted backwards under the guidance of the guide pin 154, which is moved along the guide rail 152a from the first locking hole 153 to the second locking hole 155 or from the second locking hole 155 to the first locking hole 153, the overall length of the locking unit 126 is increased or reduced. Here, when the locking unit 126 is lengthened, the protrusion tap 150 of the frame 116 is inserted into the tap receiving part 160 of the cylinder 157, so that the frame opening 133 (see, FIG. 5) of the frame 116 is closed. When the locking unit 126 is shortened, the protrusion tap 150 of the frame 116 is removed from the tap receiving part 160 of the cylinder 157, so that the frame opening 133 (see, FIG. 5) of the frame 116 is opened. In other words, the frame 116 is opened or closed depending on the position of the guide pin 154. This operation will be explained in detail herein below with reference to FIGS. 7a and 7b.

Figure 7A:
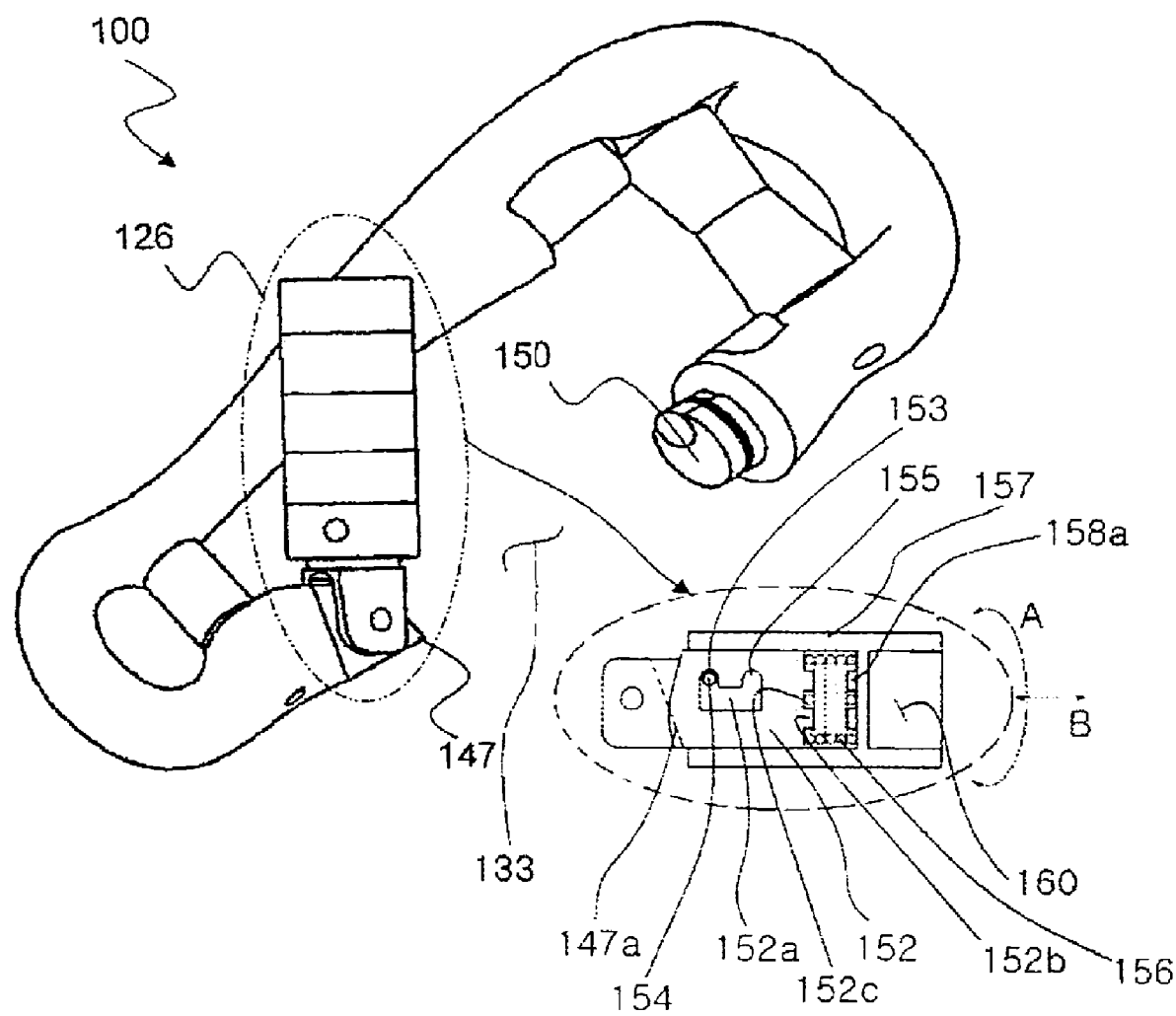
FIGS. 7a and 7b respectively are a perspective view and a partial sectional view illustrating the locking unit of the purse ring having the multiple rollers according to the embodiment of the present invention.
Figure 7B:
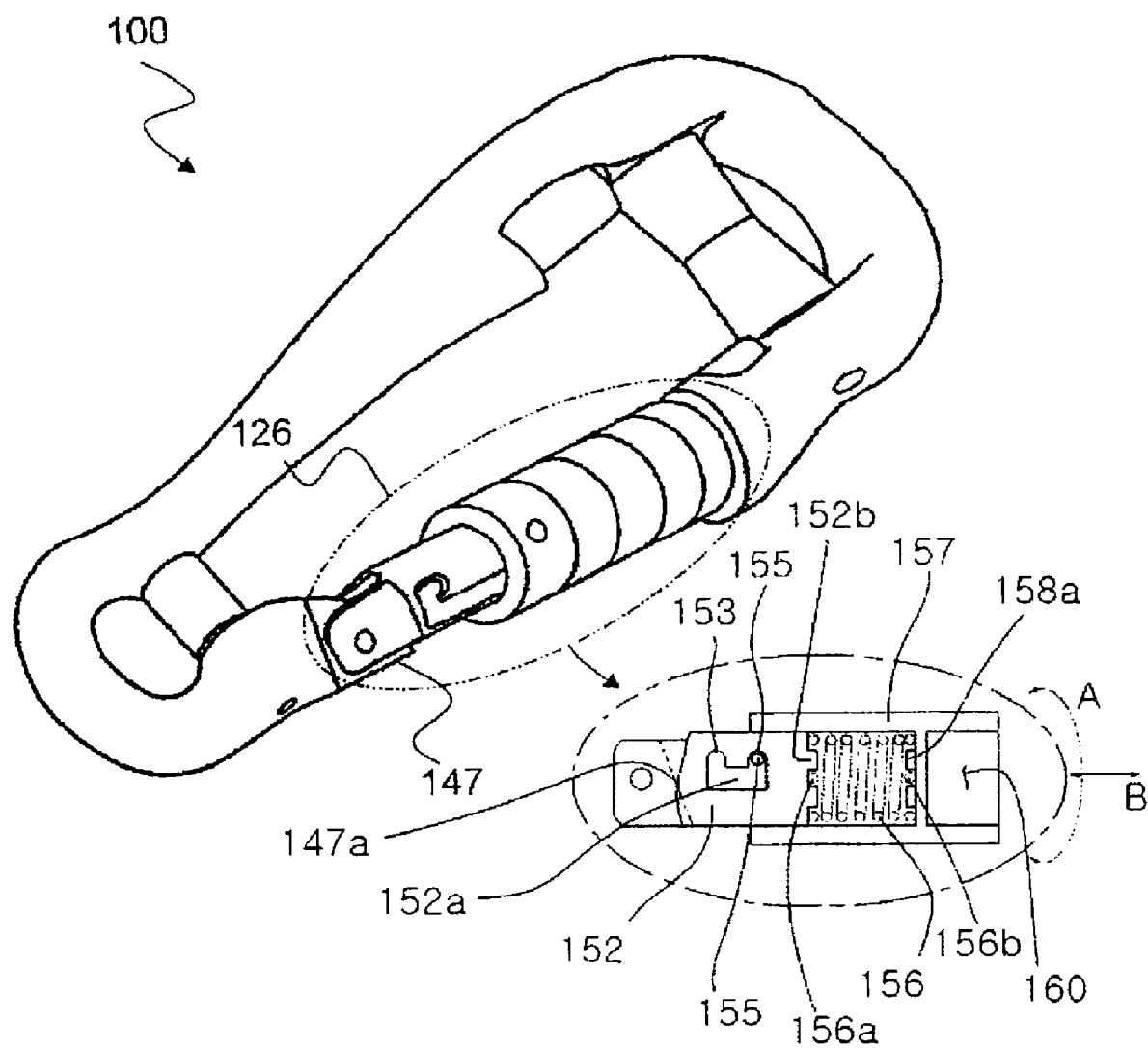

FIGS. 7a and 7b respectively are a perspective view and a partial sectional view illustrating the opening and closing operations of the locking unit 126 of the purse ring 100 according to the embodiment of the present invention.

First, FIG. 7a illustrates the open state of the frame 116. For this, the cylinder 157 is rotated in the direction A such that the guide pin 154, which has been in the second locking hole 155 of the guide rail 152a, is removed from the second locking hole 155, and, thereafter, the cylinder 157 is moved such that guide pin 154 is locked to the first locking hole 153.

In detail, because the first and second ends of the spring 156, which is placed in the cylinder 157, are respectively fastened to the first spring seating protrusion 152b of the guide rod 152 and the second spring seating protrusion 158a of the cylinder 157, when the cylinder 157 is rotated in the direction A such that the guide pin 154 is removed from the second locking hole 155, the body of the spring 156 is twisted. Subsequently, when the cylinder 157 is moved in the direction B and reversely rotated in the direction A such that the guide pin 154 is moved along the guide rail 152a and is inserted into the first locking hole 153, the reverse rotation of the cylinder 157 is automatically conducted by the elastic force of the spring 156, which has been twisted. Therefore, the guide pin 154 can be easily placed into the first locking hole 153 and prevented from being undesirably removed therefrom.

As such, while the guide pin 154 is moved from the second locking hole 155 to the first locking hole 153, the cylinder 157 is moved in the direction B in which the overall length of the locking unit is reduced. Then, the protrusion tap 150 of the frame 116 is removed from the tap receiving part 160 of the cylinder 157. As a result, the frame opening 133 of the frame 116 is opened.

When the frame opening 133 of the frame 116 is opened, the guide rod 152, which is coupled to the frame 116 by the hinge, enters a rotatable state. Here, a stopper tap 147 protrudes outwards from the part of the frame 116 that is coupled to the guide rod 152 by the hinge, and a guide stopper 147a is provided on the guide rod 152 at a position corresponding to the stopper tap 147. Therefore, when the guide rod 152 enters the rotatable state, the guide rod 152 is rotatable inwards with respect to the frame 116 but is not rotatable outwards with respect to the frame 116, because the guide stopper 147a of the guide rod 152 is stopped by the stopper tap 147.

FIG. 7b illustrates the closed state of the frame 116. For this, the cylinder 157, which has been in the open state, is rotated such that the guide pin 154, which has been in the first locking hole 153 of the guide rail 152a, is removed from the first locking hole 153, and, thereafter, the cylinder 157 is moved such that guide pin 154 is locked to the second locking hole 155.

Here, because the first insert part 156a of the spring 156 is fastened to the first spring seating protrusion 152b of the guide rod 152, and the second insert part 156b of the spring 156 is fastened to the second spring seating protrusion 158a of the rod receiving part 158, when the guide pin 154 is removed from the first locking hole 153, the spring 156, which has been compressed, is twisted and expanded. Therefore, the cylinder 157 is automatically moved in the direction B, that is, in the direction in which the guide pin 154 is moved towards the second locking hole 155 by the elastic force of the spring 156.

Thereafter, when the guide pin 154, which is moved along with the cylinder 157, reaches the end of the guide rail 152, which is adjacent to the second locking hole 155, the guide pin 154 is automatically inserted into the second locking hole 155 by the elastic force of the spring 156, which has been twisted. As such, the guide pin 154 can be easily moved and locked to the second locking hole 155.

As described above, when the cylinder 157 is moved in the direction in which the guide pin 154 is moved towards the second locking hole 155, the overall length of the locking unit 126 is increased, so that the protrusion tap 150 of the frame 116 is inserted into the tap receiving part 160 of the cylinder 157. As a result, the frame opening 133 of the frame 116 is closed.

Meanwhile, in the present invention, because the guide rod 152 and the spring 156 are placed in the cylinder 157, corrosion attributable to seawater is minimized. Furthermore, the guide rod 152, the spring 156, the guide pin 154 and the cylinder 157 are preferably made of stainless steel or, alternatively, may be made of a corrosion-resistant alloy or other corrosion-resistant material.

As described above, the present invention provides a purse ring having multiple rollers, which has a structure such that friction between a purse line and the purse ring is reduced. Therefore, the purse ring of the present invention can increase the lifetime thereof, thus reducing the cost of replacement thereof.

In addition, the purse ring of the present invention has an advantage in that operation of opening and closing a frame can be easily conducted using a locking unit.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A purse ring, to couple a purse seine and a purse line to each other, comprising:
   a frame coupled at a first end thereof to the purse seine and having the purse line passing therethrough at a second end thereof; and
   at least three rollers rotatably provided in the frame at positions at which the purse line is brought into contact with the frame.

2. The purse ring as set forth in claim 1, wherein one roller selected from among the rollers is disposed to span opposite side parts of the frame.

3. The purse ring as set forth in claims 2, wherein an insertion hole, into which a shaft serving as a rotating axis of the roller disposed to span the opposite side parts of the frame is inserted, is closed by a hemispherical cap to prevent the shaft from being removed from the frame.

4. The purse ring as set forth in claim 1, wherein one roller selected from among the rollers is provided in one side part of opposite side parts of the frame.

5. The purse ring as set forth in claim 4, wherein a mounting notch is formed in the one side part or each of the opposite side parts of the frame at a position of the roller provided in the side part or each of the opposite side parts of the frame, and the corresponding roller is provided in the mounting notch.

6. The purse ring as set forth in claim 5, wherein a frame opening is formed in the one side part of the opposite side parts of the frame, the frame opening is openably closed by a locking unit, a protrusion tap protrudes from the frame at a position corresponding to a first end of the frame opening, a hole is formed in the protrusion tap, and a coil-shaped retainer member is fitted both over the protrusion tap and over the shaft of the corresponding roller, which is placed in the hole and the mounting notch, to prevent the shaft of the roller from being removed from the frame.

7. The purse ring as set forth in claim 1, wherein two rollers selected from among the rollers are disposed to span opposite side parts of the frame.

8. The purse ring as set forth in claim 1, wherein two rollers selected from among the rollers are provided in respective opposite side parts of the frame.

9. The purse ring as set forth in claim 1, wherein one roller selected from among the rollers is provided in one side part of opposite side parts of the frame, and remaining rollers are disposed to span the opposite side parts of the frame.

10. The purse ring as set forth in claim 9, wherein an end of a shaft, which serves as a rotating axis of the roller provided in the one side part of the opposite side parts of the frame, is brought into contact with and engages with a side surface of a shaft, which serves as a rotating axis of the roller disposed to span the opposite side parts of the frame.

11. The purse ring as set forth in claim 1, wherein the rollers comprises four rollers, wherein two rollers selected from among the four rollers are disposed to span opposite side parts of the frame, and two remaining rollers are provided in respective opposite side parts of the frame.

12. The purse ring as set forth in claim 1, wherein each of the rollers and the frame is made of stainless steel, a galvanized alloy, or a corrosion-resistant alloy able to withstand force applied to the purse ring during fishing, or a mixture of substances having sufficient mechanical strength.

13. The purse ring as set forth in claim 1, wherein a frame opening is formed in the one side part of the opposite side parts of the frame, and the frame opening is openably closed by a locking unit.

14. The purse ring as set forth in claim 13, wherein the locking unit is rotatably coupled to the frame by a hinge to openably close the frame opening, wherein a stopper tap protrudes from the frame at a position corresponding to an outer portion of an end of the locking unit adjacent to the hinge, such that the locking unit is rotatable inwards relative to the frame but is not rotatable outwards relative to the frame.

15. The purse ring as set forth in claim 14, wherein the locking unit is rotatably coupled to the frame by the hinge at a position corresponding to a second end of the frame opening and comprises a guide rod provided with a guide rail, which is longitudinally formed in a surface of the guide rod, wherein a guide stopper is provided on the guide rod at a position corresponding to the stopper tap to limit rotation of the locking unit.

16. The purse ring as set forth in claim 15, wherein the locking unit further comprises:
    an elastic member provided on a front end of the guide rod;
    a cylinder, having a rod receiving part provided in a first end of the cylinder to receive the guide rod and the spring, and a tap receiving part provided in a second end of the cylinder to receive the protrusion tap provided on the frame at the position corresponding to the first end of the frame opening; and
    a guide pin fitted into a surface of the rod receiving part and placed in the guide rail of the guide rod, so that, when the cylinder is moved between a position at which the protrusion tap is inserted into the tap receiving part of the cylinder, and a position at which the protrusion tap is removed from the tap receiving part of the cylinder, the guide pin moves along the guide rail to guide movement of the cylinder, wherein
    a first locking hole and a second locking hole are formed in respective opposite ends of the guide rail, so that the guide pin, which moves along the guide rail, is locked to the first locking hole or the second locking hole.

17. The purse ring as set forth in claim 16, wherein a first insert part is provided on a first end of the elastic member and is fastened to a first spring receiving protrusion provided on the front end of the guide rod, and a second insert part is provided on a second end of the elastic member and is fastened to a second spring receiving protrusion provided on a bottom of the rod receiving part of the cylinder, so that, when the guide pin is moved along the guide rail, the cylinder is biased in a rotating direction by elasticity of the elastic member, such that the guide pin is easily inserted into and locked to the first locking hole or the second locking hole.

* * * * *